United States Patent [19]

Maxey

[11] 4,022,856

[45] May 10, 1977

[54] ANCHORABLE URETHANE FOAMS

[75] Inventor: Edwin Morgan Maxey, Kent, Ohio

[73] Assignee: The General Tire & Rubber Company, Akron, Ohio

[22] Filed: Jan. 6, 1975

[21] Appl. No.: 538,596

[52] U.S. Cl. .................. 264/26; 156/196; 156/245; 156/273; 156/306; 260/2.5 BE; 264/45.3; 264/46.4; 264/51; 264/248; 264/250; 264/294; 264/321; 264/331; 264/DIG.17; 428/403

[51] Int. Cl.² .................. B29D 27/04; B29C 27/04

[58] Field of Search ............. 264/321, DIG. 17, 26, 264/45.3, 51, 53, 54, 248, 250, 331, 294; 156/273, 77, 78, 290, 291, 196, 245, 273, 306; 260/2.5 BE; 428/403

[56] References Cited

UNITED STATES PATENTS

| | | | |
|---|---|---|---|
| 2,855,021 | 10/1958 | Hoppe | 264/DIG. 17 |
| 2,878,153 | 3/1959 | Hacklander | 264/321 X |
| 2,914,109 | 11/1959 | Hsu et al. | 264/321 X |
| 3,025,200 | | Powers | 264/54 X |
| 3,171,820 | 3/1965 | Volz | 264/321 X |
| 3,244,571 | 4/1966 | Weisman | 156/196 |
| 3,256,218 | 6/1966 | Knox | 264/DIG. 17 |
| 3,306,967 | 2/1967 | Turkewitsch | 264/321 |
| 3,393,119 | 2/1968 | Dugan | 156/273 X |
| 3,398,035 | 8/1968 | Cleereman et al. | 264/321 X |
| 3,441,523 | 4/1969 | Dwyer et al. | 264/DIG. 17 |
| 3,443,007 | 5/1969 | Hardy | 264/321 |
| 3,535,196 | 10/1970 | Laberinti et al. | 260/2.5 BE X |
| 3,632,533 | 1/1972 | Winkler | 260/2.5 BE X |
| 3,684,609 | 8/1972 | Schneider | 264/321 X |
| 3,698,933 | 10/1972 | Leeks et al. | 428/327 |

FOREIGN PATENTS OR APPLICATIONS

| | | | |
|---|---|---|---|
| 1,578,500 | 8/1969 | France | 260/2.5 BE |
| 1,081,220 | 5/1960 | Germany | 260/2.5 BE |
| 7,106,216 | 11/1971 | Netherlands | 260/2.5 BE |
| 1,233,004 | 5/1971 | United Kingdom | 260/2.5 BE |

Primary Examiner—Philip Anderson

[57] ABSTRACT

Flexible polyurethane foams are anchored to themselves or to other compatible thermoplastic materials by the application of pressure and heat to such foams which contain at least 50 parts by weight per 100 parts of polyol in the foam formulation of at least one solid theromplastic resin composition having a particle size greater than 18 mesh (1.0 mm. sieve opening) and no larger than about 2½ mesh (about 8 mm. sieve opening), preferably in the range of 16 mesh (1.2 mm. sieve opening) to 8 mesh (2.4 mm. sieve opening), in the U.S. Sieve Series.

9 Claims, 4 Drawing Figures

U.S. Patent  May 10, 1977  4,022,856
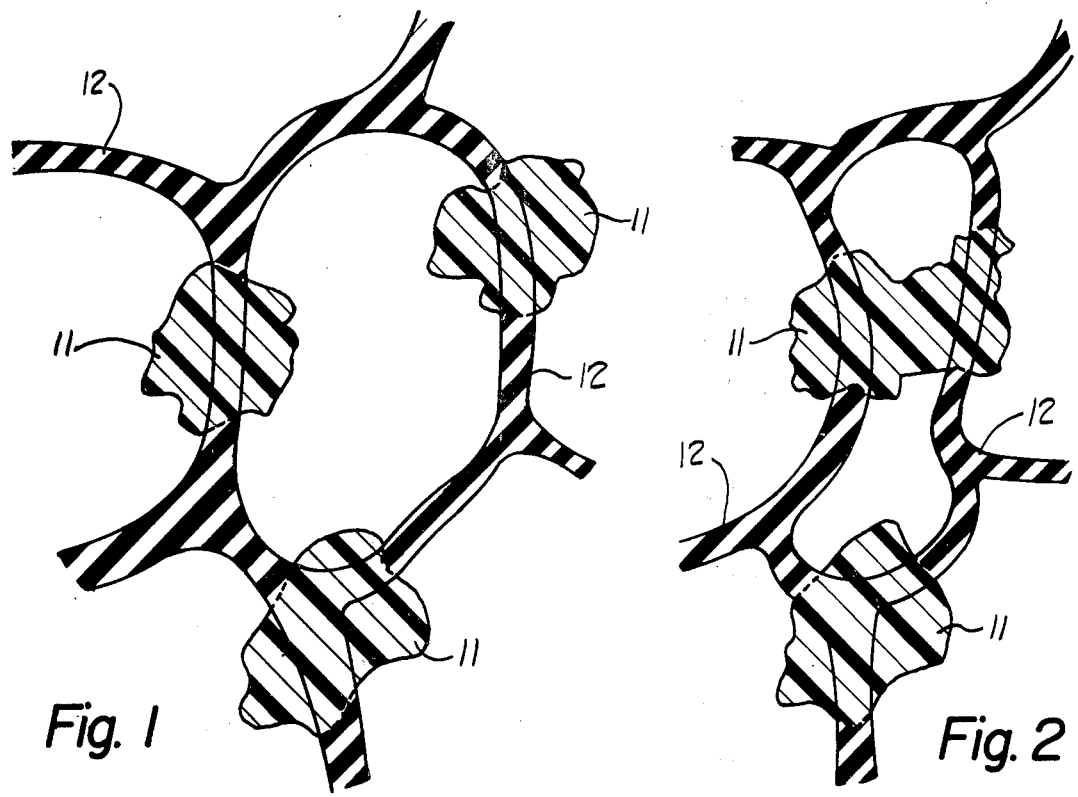
Fig. 1
Fig. 2
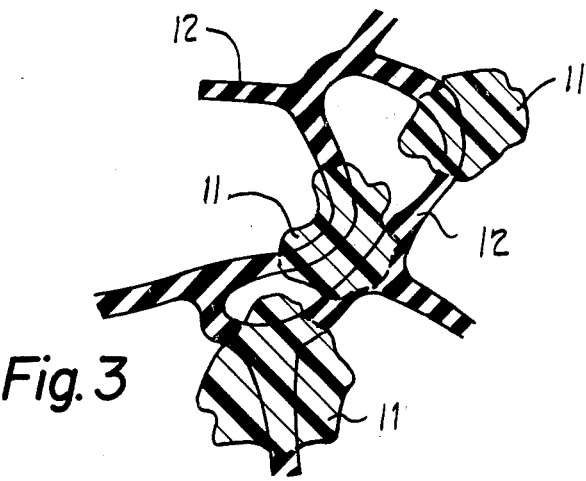
Fig. 3
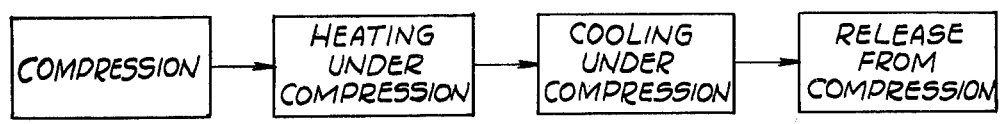
Fig. 4

ANCHORABLE URETHANE FOAMS

BACKGROUND OF THE INVENTION

This invention relates to the preparation of flexible polyurethane foams which are readily anchorable to themselves or some other substance by the application of pressure and heat.

Polyurethanes have been defined as those polymers containing the characteristic urethane linkage,

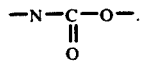

The "urethane polymers" comprise polymers wherein the urethane may be only one of many types of linkages in the polymer chain. Thus, a polyurethane may also be comprised of a wide variety of groups and linkages including oxygen-, sulfur-, nitrogen-, and carbon-containing members such as amino, urea, sulfoamino, amide, acetal, ester, ether and hydrocarbon groups and linkages.

Polyurethanes are prepared by reacting an organic polyfunctional isocyanate with an organic compound having two or more reactive hydrogen atoms (as determined by the well-known Zerewitinoff method) such as hydroxyl or amine groups on polyesters, polyester amides, polyalkylene ethers, polyacetals and polyalkylene thioethers. When a foamed product is desired, water and an excess of isocyanate are added to the mixture. When water reacts with the excess isocyanate groups not previously reacted, carbon dioxide is formed which is entrapped in the reaction mixture. An auxiliary blowing agent, such as a volatile halogenoalkane like a fluorocarbon, can also be employed.

Flexible urethane foams which can readily be anchored thermally, preferably dielectrically, to themselves or to vinyl or other thermoplastic films with a minimum of preparation are of value in a number of applications. The most pertinent reference known to applicant is U.S. Pat. No. 3,244,571, which teaches dielectrically heating the embossing articles formed of dissimilar materials, particularly a supported or unsupported thermoplastic film heat-sealed to a layer of polyester-based polyurethane foam, by introducing impurities in the form of fine particles into the foam formulation in an amount to alter the dielectric properties of the foam to an extent whereby the foam and the thermoplastic film are similarly responsive dielectrically. Polyvinyl chloride, graphite, carbon and iron oxide are recited as suitable impurities. In this system the urethane foam itself fuses with the thermoplastic film. There is no recitation as to the amount of impurity nor as to the criticality of particle size of the impurity.

Although varied formulations and post-treatments of foams have been proposed to accomplish this end, these suffer from the deficiencies of high cost due to extra material and extra handling needed or ineffective sealing under standard sealing conditions. The principal object of this invention is to provide new and improved urethane foam formulations which are readily heat (including dielectrically) anchorable to thermoplastic materials.

Heretofore halogen-containing polymers, including finely-divided solid polymers such as polyvinyl chloride, have been incorporated into flexible polyurethane foams to improve load bearing characteristics of the foams as well as to contribute to flame retardant properties of certain additive combinations in the foams. One such system is shown in U.S. Pat. No. 3,574,149. This reference discloses flexible polyetherurethane foams containing finely-divided halogen-containing resins together with zinc oxide and antimony oxide. While as much as 100 parts by weight of such resins per 100 parts by weight of polyol in the polyurethane formulation can be used "to obtain the desired load bearing characteristics", no more than about 40 parts by weight of such resins per 100 parts of polyol are necessary to achieve the desired flame retardance, and less than 30 parts were employed in the specific examples. Similarly, while the halogen-containing resins can include powder from about 0.0001 to 2 mm., particle size is not critical to the reference system, and the only specific particle size disclosed is 40 microns or 0.04 mm.

SUMMARY OF THE INVENTION

In accordance with the practice of this invention, there is incorporated into any flexible urethane foam formulation from about 50 to about 100 parts by weight per 100 parts of polyol in the foam formulation of at least one particulate polar thermoplastic resin composition, with or without plasticizer, such that the resulting prepared polyurethane foam can be readily anchored to itself or other compatible thermoplastic materials by fusion of the particulate thermoplastic resin composition by the application of appropriate energy. The particles of the thermoplastic resin must be greater than 18 mesh, i.e., able to be retained on a No. 18 sieve (U.S. of Tyler Sieve Series) and no more than about 2 ½ mesh, i.e., able to pass through a No. 2 ½ sieve. More specifically, if a solid thermoplastic resin such as plasticized polyvinyl chloride of a relatively large particle size, i.e., ranging from about 1.2 to about 8.0 mm., maximum dimension per particle, is added to a flexible polyurethane foam formulation, the thermoplastic particles are not coated by the resulting polyurethane foam but are mechanically held in the foam matrix by point contacts with the ribs of the foam. As a result, when a sheet of the foam is compressed under the bar of a dielectric sealer, the thermoplastic particles are forced into contact with each other, the important contact being thermoplastic to thermoplastic rather than foam to foam or foam to thermoplastic. The heating under the bar during the sealing cycle softens the particles so that they flow and fuse together, thus anchoring the foam in some configuration to itself or to a separate compatible thermoplastic substrate.

A BRIEF DESCRIPTION OF THE DRAWING

Reference is made to the accompanying drawing in which: FIG. 1 is an enlarged section of one possible type of cell of a flexible polyurethane foam containing dispersed therein a solid thermoplastic resin composition.

FIGS. 2 and 3 are enlarged sections of the cell of FIG. 1 illustrating two possible configurations after treatment by the method of this invention.

FIG. 4 is a diagram of the step of the method of this invention.

DESCRIPTION OF THE PREFERRED EMBODIMENTS

The practice of this invention contemplates utilizing a wide range of particulate polar thermoplastic resins whether or not compatible with urethanes so long as said resins do not interfere with urethane foam formulation.

Typical thermoplastic resins for the practice of this invention using dielectrical heating include poly(methyl methacrylate) or copolymers incorporating at least 50 mole percent methyl methacrylate; polyvinyl halide polymers such as poly(vinyl chloride) and poly(vinylidene chloride) and copolymers thereof including particularly vinyl chloride-vinyl acetate copolymers; poly(caprolactam); poly(hexamethyleneadipamide); and poly(ethylene terephthalate). Additional typical thermoplastic resins for simple heat sealing include styrene-butadiene block copolymers; styrene-isoprene block copolymers; polystyrene, especially foamable polystyrene; and low density polyethylene.

In the practice of this invention, the important factor is the particle size of the thermoplastic resin to be incorporated into the foam. The lower limit of size is that above which the particle is not incorporated into the ribs of the foam so that the particle avoids being coated with the urethane material of the foam. This is generally assured where the resin particle size is larger than the average foam cell. The upper limit of size appears to be that which can be handled on processing equipment for foam manufacture, providing only that the number of particles present is sufficient to insure that the thermoplastic resin can make contact with other particles and with a bonding substrate, if any. As the resin particle size increases, the even distribution of particles in the foam matrix becomes more of a problem, but the load factor of the resulting foam improves.

Typically, in this invention the particle size of the thermoplastic resin foam component is greater than 18 mesh but less than 2 ½ mesh within the U.S. Sieve Series. This means that the subject particles pass through a No. 2 ½ sieve but are retained on a No. 18 sieve. Thus, the particle diameters (based on substantially uniform spheroid particles) range from greater than 1.0 mm. to no more than about 8.0 mm. Preferably, the subject particles pass through a No. 8 sieve but are retained on a No. 16 sieve equivalent to a particle diameter range of from about 1.2 mm. to about 2.4 mm. Preferably, particles larger than those defined are not present because they present too much of a dispersion problem. Particles smaller than those defined can be present in amounts less than 50 weight percent, of the total resin particles, but in no case should there be more than about 100 parts by weight of all such thermoplastic resin particles per 100 parts of polyol in the foam formulation.

A wide variety of plasticizers can be used with the thermoplastic resins in the practice of this invention. The plasticizers are well-known commercial classes of materials. Typical plasticizers fall into such general classes as, for example, organic phosphates such as triethyl phosphate, tricresyl phosphate, tributyl phosphate, triphenyl phosphate, diphenyl-xylyl phosphate and alkyl aryl phosphates; polyols such as ethylene glycol and hexanetriol; aliphatic and/or aromatic esters such as diethyl adipate, dibutyl adipate, dihexyl adipate, dinonyl adipate, triethyl citrate, acetyl triethyl citrate, di-isoctyl azelate, dihexyl azelate, methyl abietate, dibutyl fumarate, dioctyl fumarate, octyl stearate, cyclohexyl stearate, butyl acetoxystearate, dimethyl phthalate, diethyl phthalate, dibutyl phthalate and dioctyl phthalate; certain polyol esters such as ethyl phthalyl ethyl glycolate, ethyl phthalyl ethyl glycolate, diethylene glycol dibenzoate and triethylene glycol dibenzoate; and certain hydrocarbons.

The desired thermoplastic resin 11, with or without plasticizer, is incorporated into a polyurethane foam composition 12 in an amount sufficient to anchor the resulting foam by fusion of the thermoplastic resin to itself as illustrated in FIG. 3 or to a compatible substrate material. Typically, it is added to a flexible foam formulation in an amount of at least about 50 parts by weight of thermoplastic resin per 100 parts by weight of polyol in the polyurethane. Preferably, no more than about 100 parts by weight of thermoplastic resin is employed per 100 parts of said polyol.

Compatibility is determined simply by trying to fuse dissimilar thermoplastic materials. If they form a homogeneous melt mix, they are compatible. If they form a heterogeneous melt mix, they are incompatible for the purposes of this invention.

As illustrated in FIG. 4, the method of this invention comprises compressing the defined resin-filled polyurethane foam, heating the compressed foam to fuse at least some of the resin (possibly as shown, for example, in FIGS. 2 and 3), cooling the foam to solidify the fused resin, and releasing the cooled foam from compression whereby the compressed form is substantially maintained.

In the practice of this invention, it is broadly contemplated that any suitable thermal energy from any source and in any form can be used for fusing the defined thermoplastic particles to themselves or to a compatible substrate, thereby anchoring the flexible urethane foam. The preferred source of energy is dielectric heating as further described in the aforementioned U.S. Pat. No. 3,244,571. The compatible substrates are typically thermoplastic materials such as those listed hereinbefore for the thermoplastic resin particles.

The most widely accepted method of making flexible polyurethane foams is to react an organic polyisocyanate with a polyol or other compound containing active hydrogen, i.e., a hydrogen that is active as measured and determined by the Zerewitinoff method JACS, vol. 49, p. 3181 et. seq. (1927). Optionally, other ingredients can be used such as water, auxiliary blowing agents, catalysts and surface active agents.

The preferred polyols for use in the foams of this invention are polyalkyleneether polyols which are now well known in the art and which are generally prepared by reacting a polyhydric alcohol, phenol or an amine with an alkylene oxide in the presence of a catalyst. The preferred reactants are polyhydric alcohols such as ethylene glycol, pentaerythritol, propylene glycol, 2,3-butylene glycol, 1,3-butylene glycol, 1,5-pentanediol, 1,6-hexanediol, glycerol, trimethylopropane and mixtures thereof. Suitable alkylene oxides include ethylene oxide, propylene oxide, butylene oxide, amylene oxide, epichlorohydrin and mixtures of these. Other polyether polyols well known in the art can be included or substituted in the systems of this invention regardless of their methods of preparation. Mixtures of such polyols can also be employed.

If desired, a portion of the polyhydric alcohol can be replaced with another compound having preferably two reactive hydrogen atoms, such as alkyl amines, alkylene polyamines, cyclic amines, amides and polycarboxylic acids. Suitable alkyl amines and alkylene polyamines include methylamine, ethylamine, propylamine, butylamine, hexylamine, ethylene diamine, 1,6-hexane diamine, diethylene triamine, and the like.

Also, cyclic amines such as piperazine, 2-methylpiperazine and 2,5-dimethyl-piperazine can be used.

The polyalkyleneether polyols usable in this invention have an average hydroxyl functionality of 2 to 4, preferably 2 to 3, and average equivalent weights of 1000 to 4000 per hydroxyl group. In the commercially available polyols of this type from 5 to 85 percent of the total hydroxyl groups usually are primary hydroxyl groups. Preferably, said polyols have a maximum number average molecular weight of about 6500.

The preferred polyalkyleneether polyols usable in this invention are homopolymers of propylene oxide or copolymers of propylene oxide with other alkylene oxides. If ethylene oxide is a comonomer, it can be present in the final polyol in amounts up to 30 mol percent.

In the foams of this invention, water in an amount from about 1 to 5, preferably 1.5 to 4, parts by weight per 100 parts of polyol is usually added to the formulation to help produce carbon dioxide to develop foam structure. The water should be treated to remove impurities such as iron, calcium salts and other materials. Preferably, the water should be subjected to treatment with ion exchange resins or distilled to remove virtually all of the impurities.

While a wide variety of polyisocyanate compounds can be used in the polyurethane reaction as is well known in the art, the preferred polyisocyanates for this invention are the aromatic hydrocarbon diisocyanates containing no more than about 30 carbon atoms, preferably no more than about 15 carbon atoms, such as toluene-2,4- and -2,6-diisocyanates; diphenylmethane-p,p'-or -m,m'-diisocyanates and their polymers; and di-isocyanatomethyl benzene. However, other organic diisocyanates and polyisocyanates can be included or substituted as is well known in the art. It is to be understood that mixtures of two or more di- and/or polyisocyanates can be employed as well as both monomeric and polymeric forms.

The isocyanate or isocyanates are employed in amounts sufficient to give 0.9 to 1.3, preferably 1.05 to 1.15, isocyanate groups per total active hydrogen atoms in the polyol and the water, water containing two active hydrogen atoms per molecule.

In the polyurethane reaction the isocyanate reacts with the polyol and water in the presence of a catalyst wherein the polyol reacts with some of the isocyanate to form a chain extended polyurethane, more of the isocyanate reacts with the water to form carbamic acid that breaks down to form a primary amine and carbon dioxide, the carbon dioxide expands the polyurethane into a cellular structure of foam, and the primary amine formed from the gas reaction reacts with further isocyanate to form a di-substituted urea which in turn may react with more isocyanate to form crosslinking biuret structures. Further, blowing agents other than water can be used such as the halogenated hydrocarbons like trichlorofluoromethane, dichlorodifluoromethane, dichlorofluoromethane, dichlorofluoroethane, difluorobromoethane, difluorodibromoethane and difluorodichloroethane.

Any organic compound having at least two reactive or labile hydrogen atoms as determined by the Zerewitinoff method having the characteristics set forth above can be used in practicing this invention as the component which is reacted with the organic polyisocyanate. In addition, the invention contemplates mixtures of various compounds of this type. For example, any suitable hydroxyl polyester can be used such as, for example, an ester prepared from an aliphatic or aromatic polycarboxylic acid and a polyhydric alcohol. Any polycarboxylic acid can be used in the preparation of the polyester including, for example, adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol can be used such as, for example, ethylene glycol, propylene glycol, butylene glycol, hexanediol, bis(hydroxymethyl) cyclohexane, trimethylol propane, trimethylolethane, hexanetriol, glycerine, pentaerythritol, sorbitol xylene glycol, p-phenylene di ($\beta$-hydroxyethylether) and the like.

Any suitable catalyst can be used, such as a tertiary amino and/or an organo metallic compound. For example, the tertiary amine can be dimethyl benzyl amine; an N-alkyl morpholine such as N-ethyl morpholine and N-methyl morpholine; N,N'-dialkyl piperazine such as N,N'-diethyl piperazine and N,N'-dipropyl piperazine; 1-alkoxy-3-dimethylamino propane such as 1-methoxy-3-dimethylamino propane; alkalis such as sodium hydroxide; alkali metal phenolates such as sodium phenolate; alkaline earth metal oxides such as calcium oxide; salts of amines and organic acids such as diethyl amino oleate; tin compounds such as stannous oleate, stannous octoate, dibutyl tin dilaurate, dibutyl tin di(2-ethylhexoate) and the like, or any other suitable metal catalyst.

Various other additives such as paraffin oils and/or surfactants can be added for regulation of the pore size of the foam. Likewise, a wide variety of fillers, dye stuffs, colorants, pigments, emulsifiers, and stabilizers are contemplated.

The following examples are illustrative of the best presently known methods for practicing this invention. Unless otherwise noted, all quantitative measurements are by weight.

EXAMPLE I

A polyetherurethane foam formulation was prepared with the ingredients summarized in TABLE I-A.

TABLE I-A

| COMPONENTS | PARTS |
| --- | --- |
| 3700 mol. wt. polyoxypropylene-polyoxyethylene triol | 100 |
| A commercial plasticized polyvinyl chloride (PVC) chopped to nominally 1.6 mm. diameter particles | 100 |
| N-methyl morpholine | 0.6 |
| N,N,N',N'-tetramethyl butane diamine | 0.05 |
| Water | 4.0 |
| Silicone surfactant | 1.0 |
| Stannous octoate | 0.43 |
| 80/20 mixture of 2,4- & 2,6- toluene diisocyanate isomers (TDI) | 52 |

This formulation was run on a hand mix to give a 48.9 kg/m.$^3$ density foam. This foam was cut into 6.35 mm. thick sections which were then dielectrically sealed to vinyl film and compared with the bonds developed by a control foam containing no PVC particles.

The control foam did not bond to the vinyl film. The foams containing the particulate plasticized PVC material gave a peel strength of 0.36 kg. pulling two seals simultaneously in peel in the direction of the seal. Compression loads, using 10 × 10 × 5 cm. samples, are summarized in TABLE I-B.

TABLE I-B

| | |
|---|---|
| 25% deflection load, kg. | 3.68 |
| 65% deflection load, kg. | 8.88 |
| Load factor, the ratio of 65% deflection load to 25% deflection load | 2.41 |

A typical polyether-polyol-TDI water-blown flexible foam without the fused PVC plastisol gives a load factor of 1.8.

EXAMPLE II

A polyesterurethane foam formulation was prepared with the ingredients summarized in TABLE II-A.

TABLE II-A

| COMPONENTS | PARTS |
|---|---|
| Hydroxyl terminated polyester of diethylene glycol and adipic acid with a hydroxyl number of 50 | 200 |
| Water | 6 |
| N-methyl morpholine | 2 |
| Silicone surfactant | 4 |
| N,N-dimethylhexadecylamine | 2.4 |
| A commercial plasticized polyvinyl chloride (PVC) chopped to nominally 1.6 mm. diameter particles | 100 |
| 80/20 mixture of 2,4 & 2,6 toluene diisocyanate isomers (TDI) | 78 |

As in EXAMPLE I, a control foam was run without the PVC particles. The foams were dielectrically sealed to vinyl film. Both the control and the subject foam gave a bond.

The results of a double seal longitudinal peel are summarized in TABLE II-B.

TABLE II-B

| | |
|---|---|
| Control | 0.36 kg. |
| Foam containing particulate PVC | 2.2 kg. |

The process of this invention for making sealable foams has several advantages over processes described in the patent literature. First, it is a one-step process. Secondly, the foams are of relatively low density. Third, since the particles are almost independent of the foam structure, there is very little effect on tensile, tear, elongation and other properties of the foam. As an additional advantage, the load factor of the foam (ratio of 65 percent compression or indent load reflection to 25 percent compression or indent load deflection) is materially increased, an advantage in cushioning applications. Both on the basis of cost and properties, then, this process is superior to prior art methods.

I claim:

1. The method for deforming and anchoring a flexible polyurethane foam containing dispersed therein at least 50 parts by weight per 100 parts by weight of polyol in the formulation of said polyurethane of at least one solid thermoplastic resin composition fusible at a temperature below the fusion point of said polyurethane and composed of particles greater than 18 mesh (U.S. Sieve Series) and no larger than 2½ mesh (U.S. Sieve Series), any of said solid termoplastic resin compositions outside this particle size range being present in a total amount no greater than 50 percent by weight based on the weight of said solid thermoplastic resin composition within said particle size range, the total of all of said solid thermoplastic resin compositions being no greater than 100 parts by weight per 100 parts by weight of said polyol, said method comprising:
 1. deforming said foam by compression thereof;
 2. subjecting said foam while under said compression to sufficient heat to fuse at least some of said thermoplastic resin composition within said particle range without significantly fusing or otherwise decomposing said foam;
 3. causing said fused thermoplastic resin composition to solidify while said foam is under said compression; and
 4. releasing said foam from said compression whereby said foam remains substantially as deformed as when under compression.

2. The method of claim 1, wherein said foam is prepared by incorporating said solid thermoplastic resin composition in the formulation for said foam and subsequently foaming and curing said foam formulation to produce said flexible foam with said solid thermoplastic resin composition dispersed therein.

3. The method of claim 2 wherein said thermoplastic resin composition is a plasticized polyvinyl halide polymer composed of particles greater than 16 mesh (U.S. Sieve Series) and no greater than 8 mesh (U.S. Sieve Series).

4. The method of claim 1 wherein said heat in step (2) is supplied by dielectric heating.

5. The method of claim 4 wherein said foam in step (1) is subjected to pressure against a solid thermoplastic substrate compatible with said defined thermoplastic resin composition.

6. The method of claim 4 wherein said thermoplastic resin composition is a plasticized polyvinyl halide polymer.

7. The method of claim 6 wherein said plasticized polyvinyl halide polymer is composed of particles greater than 16 mesh (U.S. Sieve Series) and no greater than 8 mesh (U.S. Sieve Series).

8. The method of claim 7 wherein said polyurethane foam is a polyetherurethane foam.

9. The method of claim 7 wherein said polyurethane foam is a polysterurethane foam.

* * * * *

UNITED STATES PATENT AND TRADEMARK OFFICE
CERTIFICATE OF CORRECTION

PATENT NO. : 4,022,856
DATED : May 10, 1977
INVENTOR(S) : Edwin Morgan Maxey

It is certified that error appears in the above-identified patent and that said Letters Patent are hereby corrected as shown below:

Column 8, line 55, which reads: "polysterurethane" should read ---polyesterurethane---.

Signed and Sealed this ninth Day of August 1977

[SEAL]

Attest:

RUTH C. MASON
*Attesting Officer*

C. MARSHALL DANN
*Commissioner of Patents and Trademarks*